United States Patent
Mullen et al.

(10) Patent No.: US 8,602,166 B2
(45) Date of Patent: Dec. 10, 2013

(54) SECONDARY LUBRICATION SYSTEM WITH INJECTABLE ADDITIVE

(75) Inventors: Michael F. Mullen, Cheshire, CT (US); Clark V. Cooper, Glastonbury, CT (US); Adam R. Glasser, Wolcott, CT (US); Thomas L. Sbabo, Hamden, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 1527 days.

(21) Appl. No.: 11/610,548

(22) Filed: Dec. 14, 2006

(65) Prior Publication Data

US 2007/0261922 A1 Nov. 15, 2007

Related U.S. Application Data

(60) Provisional application No. 60/756,917, filed on Jan. 5, 2006.

(51) Int. Cl.
*F01M 1/00* (2006.01)

(52) U.S. Cl.
USPC .......... 184/6.26; 184/6.12; 184/65; 184/6.22; 184/6.21

(58) Field of Classification Search
USPC ............... 184/6.26, 6.12, 6.21, 6.22
See application file for complete search history.

(56) References Cited

U.S. PATENT DOCUMENTS

| | | | |
|---|---|---|---|
| 4,128,140 A * | 12/1978 | Riches | 184/1.5 |
| 4,858,426 A | 8/1989 | Holcomb | |
| 5,046,306 A | 9/1991 | Borre, Jr. | |
| 5,097,926 A | 3/1992 | Duello | |
| 5,344,101 A | 9/1994 | Francois | |
| 5,465,810 A * | 11/1995 | Peterson et al. | 184/6.21 |
| 5,893,423 A | 4/1999 | Selfors et al. | |
| 6,016,993 A | 1/2000 | Maino et al. | |
| 6,374,797 B1 * | 4/2002 | Fischer | 123/196 R |
| 6,394,387 B1 | 5/2002 | Mitrovic | |
| 6,543,580 B1 * | 4/2003 | Gathmann et al. | 184/7.4 |
| 6,691,830 B2 * | 2/2004 | Blanc et al. | 184/6.2 |
| 6,817,448 B2 | 11/2004 | Maret et al. | |
| 6,938,585 B2 * | 9/2005 | Schneider | 123/1 A |
| 7,118,336 B2 | 10/2006 | Waddleton | |
| 7,207,308 B2 * | 4/2007 | Venhaus et al. | 123/196 R |
| 2002/0084146 A1 * | 7/2002 | Itoh | 184/57 |
| 2002/0148529 A1 * | 10/2002 | Berndorfer et al. | 141/67 |
| 2003/0000773 A1 * | 1/2003 | Engler et al. | 184/6.26 |
| 2004/0079589 A1 * | 4/2004 | Schneider | 184/1.5 |

\* cited by examiner

*Primary Examiner* — Robert A Siconolfi
*Assistant Examiner* — James Hsiao
(74) *Attorney, Agent, or Firm* — Carlson, Gaskey & Olds, P.C.

(57) ABSTRACT

A lubrication system includes an additive and a delivery system. During normal operational conditions, the lubricating oil circulating in the transmission system is collected and contained in a secondary oil reservoir to retain a quantity of the lubricating oil for use in an oil-out condition. When an oil-out condition is detected, the additive is injected and mixed with the collected lubricating oil in the secondary oil reservoir or dispersed directly into a power transmission gearbox housing to enhance the characteristics of the lubricating oil and increases the operational time period of the power transmission gearbox during an oil-out condition.

9 Claims, 4 Drawing Sheets

SECONDARY LUBRICATION SYSTEM WITH INJECTABLE ADDITIVE

The present application claims priority to U.S. Provisional Patent Application Ser. No. 60/756,917, filed Jan. 5, 2006.

BACKGROUND OF THE INVENTION

The present invention relates to a lubrication system, and more particularly to a secondary lubrication system that incorporates a concentrated lubricating oil additive selectively injected into the secondary lubrication system to enable prolonged oil-out operation.

Rotary-wing aircraft power transmission systems incorporate a multitude of gears and bearings which are subject to heat, sliding and surface wear. Such conditions are significantly increased during oil-out operating conditions caused by, for example, ballistic damage, pump failure and system leaks. The primary components of a power transmission system which may be failure points under oil-out conditions include bearings and gears which are constantly oil lubricated under normal conditions using pressurized oil jets or splash oil lubrication methods.

The United States Department of Defense (U.S. DoD) currently imposes a requirement that all rotary-wing aircraft power transmission systems operate for a predetermined period of time in an oil-out condition. The requirement includes the capability to maintain flight operations for 30 to 60 minutes during the oil-out condition, albeit at reduced power levels, sufficient only to sustain level flight operations.

Various emergency or secondary lubrication systems are known and practiced. Lubricating wicks and jets have been provided for lubricating individual components along with a small recirculation system. Air aspirated nozzles have also been utilized for delivering a stream of oil to each individual component. Even through relatively effective, these existing systems have not completely satisfies the U.S. DoD imposed requirements.

Accordingly, it is desirable to provide a secondary or emergency lubrication system which allows a power transmission system to operate for a prolonged time period under oil-out conditions.

SUMMARY OF THE INVENTION

The lubrication system according to the present invention includes a lubricating oil additive and a delivery system. During normal operational conditions, the lubrication oil which circulates in the transmission system is collected in a secondary or "emergency" oil reservoir for use in an oil-out condition. When an oil-out condition is detected, an additive is injected and mixed with the collected lubricating oil in the secondary oil reservoir or dispersed directly into a transmission gearbox housing. Upon mixing with the lubricating oil, the additive enhances the characteristics of the lubricating oil to enhance prolonged oil-out operation. Alternatively, on the detection of an oil-out situation, an auxiliary oil supply comprising a lubricant that contains additives for enhanced survival would be activated to inject the enhanced lubricant directly into a transmission gearbox housing.

The lubrication system provides a typical power transmission system more than double the time period under which the transmission system may otherwise operate under an oil-out condition. Moreover, the lubrication system is capable of satisfying the U.S DoD imposed requirements for all areas/components within the power transmission system.

The present invention therefore provides a secondary or emergency lubrication system which allows the power transmission system to operate for a prolonged time period under oil-out conditions.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
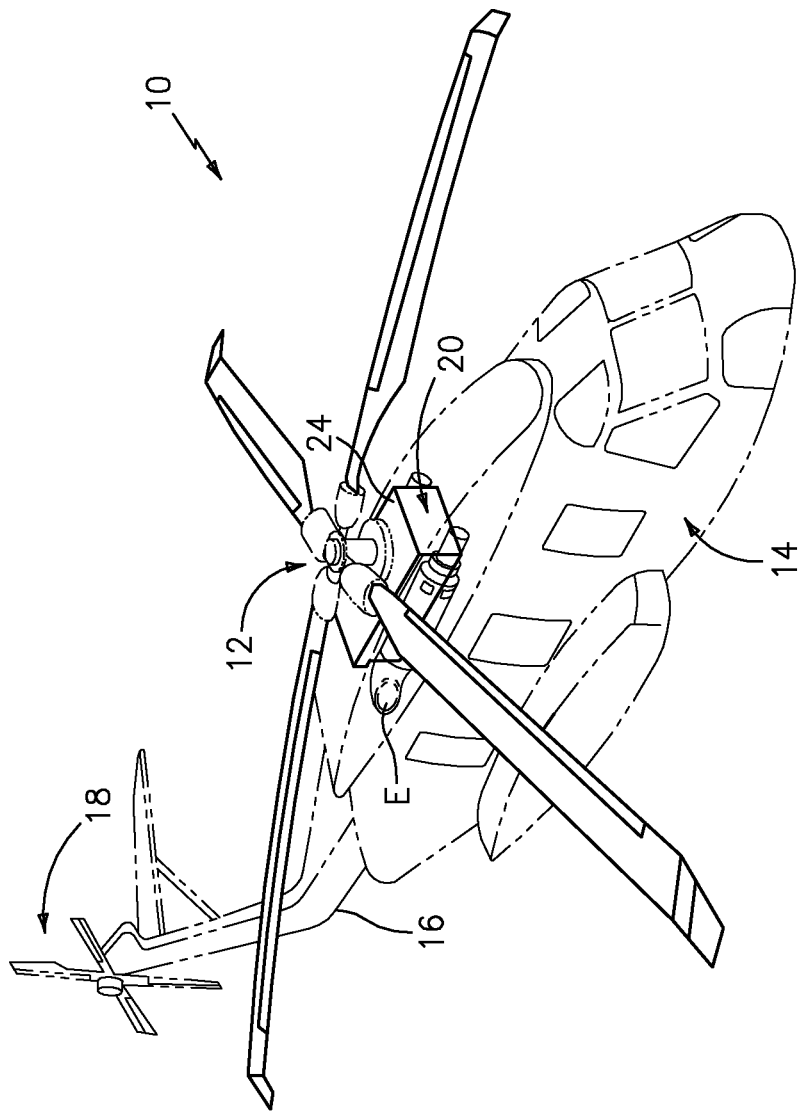
FIG. 1 is a general perspective view an exemplary rotary wing aircraft embodiment for use with the present invention.

FIG. 1 schematically illustrates a rotary-wing aircraft 10 having a main rotor system 12. The aircraft 10 includes an airframe 14 having an extending tail 16 which mounts a tail rotor system 18, such as an anti-torque system. The main rotor assembly 12 is driven through a main power transmission gearbox (illustrated schematically at 20) by one or more engines E. Although a particular helicopter configuration is illustrated and described in the disclosed embodiment, other configurations and/or machines, such as ground vehicles, jet aircraft, turbofan engines, high speed compound rotary wing aircraft with supplemental translational thrust systems, dual contra-rotating, coaxial rotor system aircraft, turbo-props, tilt-rotors and tilt-wing aircraft, will also benefit from the present invention.

The main power transmission gearbox 20 carries torque from the engines E through a multitude of gear train paths to a main rotor shaft 22 of the main rotor system 12. The gearbox 20 is preferably located within a housing 24 which may at least partially support the main rotor shaft 22. The invention described herein is best illustrated by reference to the illustrated rotary-wing aircraft main power transmission gearbox having highly-loaded torque transmitting gears and bearings, however, it will be appreciated that the inventive teachings are applicable to any system which may require oil-out operation.

Figure 2A:
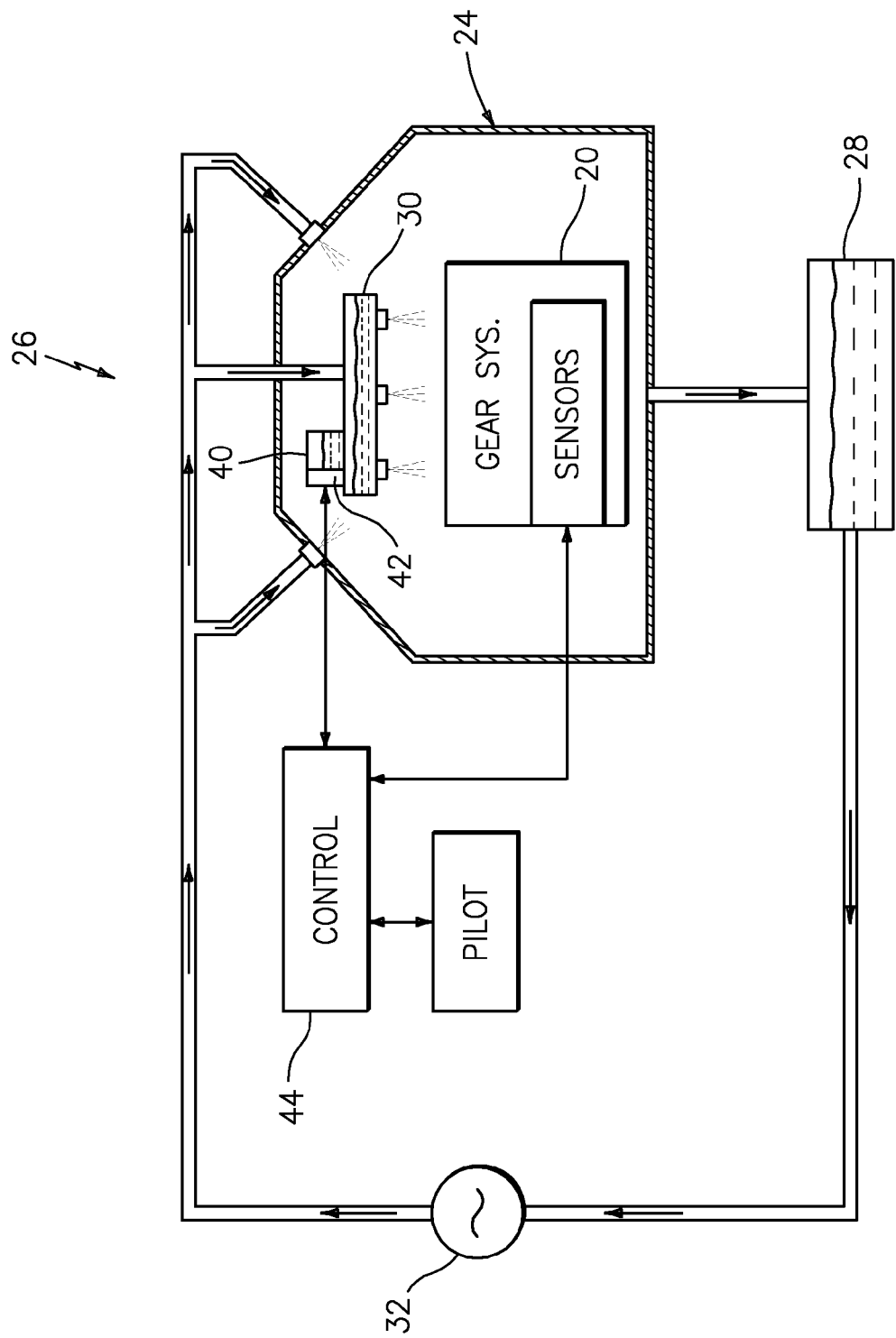
FIGS. 2A and 2B are block diagrams of a lubrication system according to the present invention.

Referring to FIG. 2A, a lubrication system 26 communicates with the gearbox 20 within the housing 24. The lubrication system 26 generally includes a primary oil reservoir 28 and an "emergency" or secondary oil reservoir 30 which retains a quantity of lubricating oil for use under "emergency" conditions such as an oil-out condition. Various primary communication systems 32 such as pumps and the like are utilized to circulate lubricating oil from the primary oil reservoir 28 into the housing 24 and to other high friction locations to provide for effective operation of the gearbox 20 and other system during normal operational conditions. The primary communication systems 32 need not be described in detail herein as various systems may be utilized in accordance with the principles of the present invention. Furthermore, it should be understood that various lubricating oils may also be used herewith, such as, for example, DOD-L-85734 or MIL-PRF-23699.

Preferably, a quantity of lubricating oil contained within the secondary oil reservoir 30 is interchanged with operating lubricating oil during normal operational conditions of the lubricating system 26. That is, the lubricating oil may be circulated through the secondary oil reservoir 30 such that the lubricating oil contained therein is refreshed yet always maintained in an essentially filled condition during normal operational conditions. Although the secondary oil reservoir 30 is illustrated within the housing 24, it should be understood that other locations outside or partially inside and outside of the housing 24 may also be utilized with the present invention.

Figure 3:
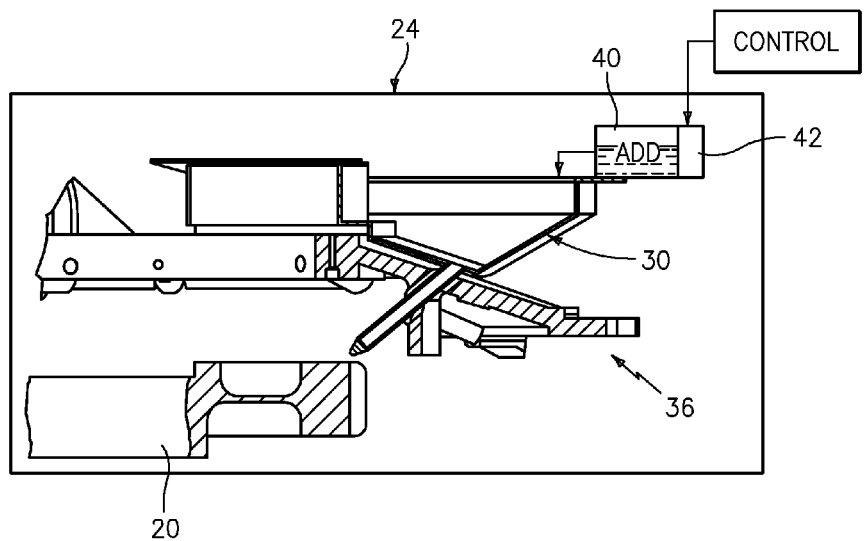
FIG. 3 is a schematic diagram of a drip type of lubricating oil delivery system.
Figure 4:
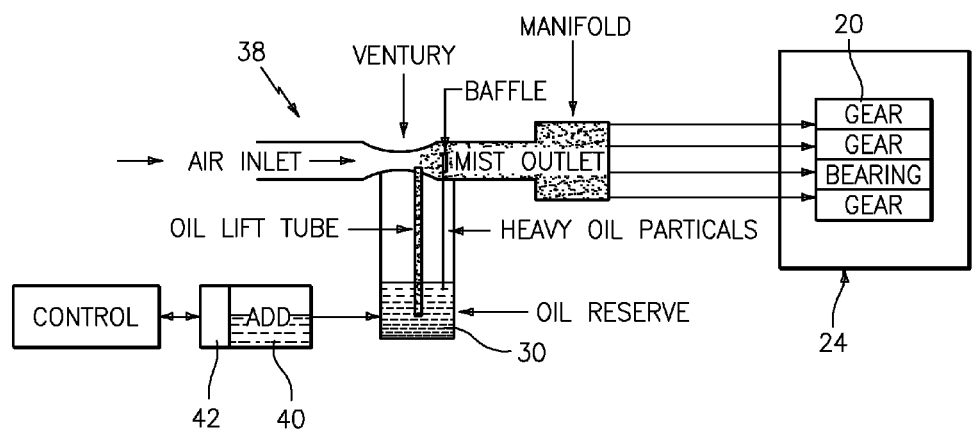
FIG. 4 is a schematic diagram of a mist type of lubricating oil delivery system.

Various secondary communication systems 34 such as a drip tank system 36 (FIG. 3), an oil mist system 38 (FIG. 4) as well as other "emergency" delivery systems are utilized to communicate the quantity of lubricating oil contained within the secondary oil reservoir 30 into the housing 24 and to other high friction locations to provide for short term operation of the gearbox 20 and other systems during oil-out conditions. It should be understood that the secondary communication system 34 may be of various forms and may be integrated or separate from primary communication system 32.

An additive reservoir 40 contains an additive which is selectively injectable into the secondary oil reservoir 30 by a delivery system 42 to enhance the characteristics of the lubricating oil collected in the secondary oil reservoir 30 in response to an oil-out condition. The delivery system 42 communicates the additive from the additive reservoir 40 into the secondary oil reservoir 30. Preferably, the delivery system 42 includes a pressurization system which injects and mixes the additive into the lubricating oil collected in the secondary oil reservoir 30 prior to communication into the housing 24. Alternatively, the oil additive substance is not stored separately, but contained within the secondary oil reservoir 30 but only mixed with the collected lubricating oil during oil-out operation.

Figure 2B:
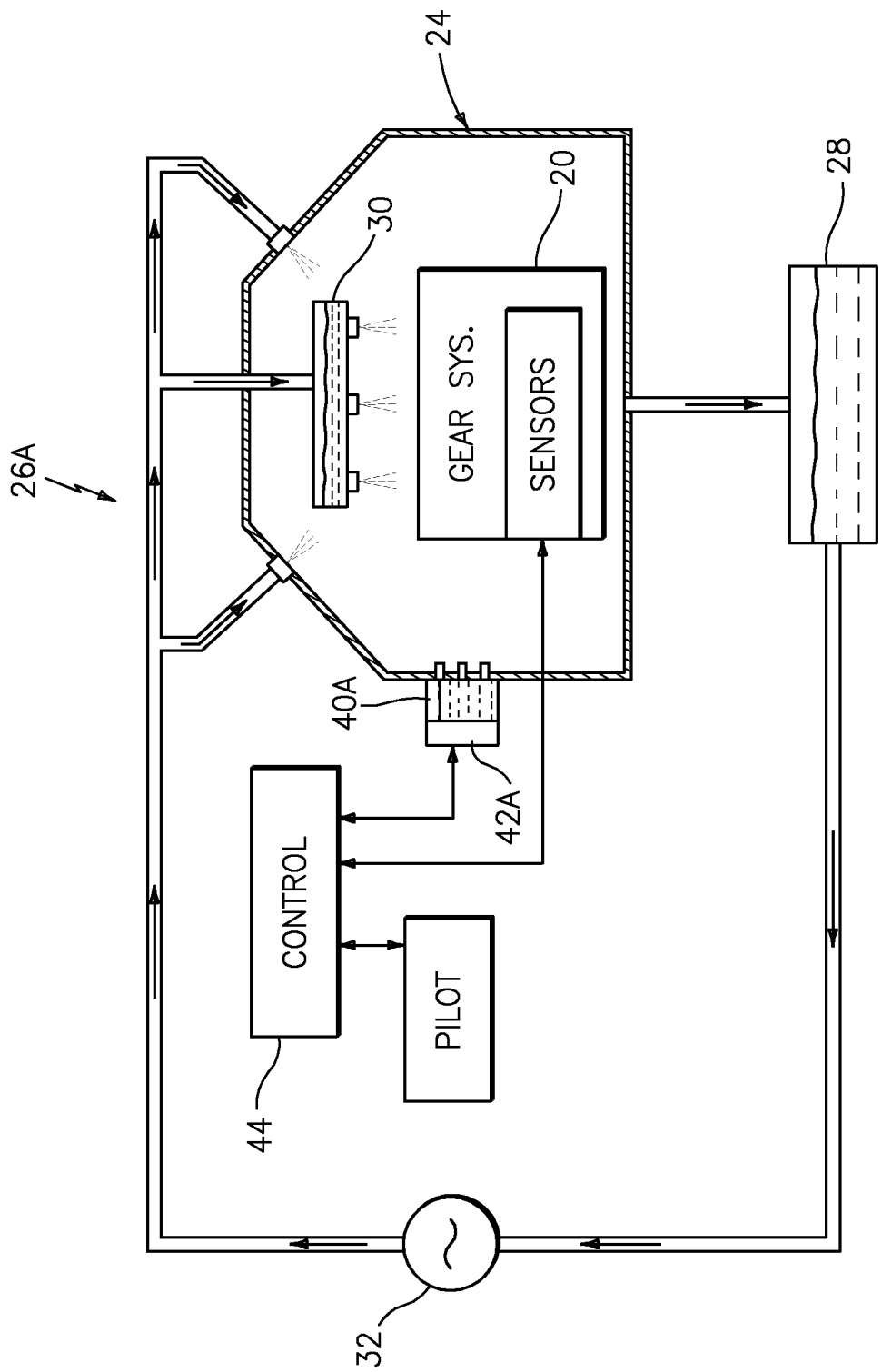

Alternatively or in addition thereto, a delivery system 42A (FIG. 2B) communicates the additive from the additive reservoir 40 directly into the housing 24. The delivery system 42A releases the additive into the atmosphere of the housing 24 separately from the lubricating oil delivered from the secondary oil reservoir 30. The injection of the additive into the housing 24 essentially coats the entire interior contents of the gearbox 20 to enhance the functional surfaces of the bearings and gears therein. The delivery system 42A may be pressurized by relatively small lightweight pressure canisters or may be attached to a remote air pressure device such as a bleed air source.

The delivery system 42, 42A additionally includes either or both of an automatic or manual control system 44 to control injection of the additive. That is, the lubrication system 26, 26A may include either or both of an automatic check system such as an electro-mechanical system utilizing pressure monitoring sensors and/or require the involvement of a pilot operable manual initiator in the decision loop to initiate operation of the delivery system 42, 42A so as to minimize a false detection of an emergency oil-out condition. This is preferred because the additive may have long term corrosive or other detrimental effects on the gearbox 20 due to the chemical aggressiveness of the additives.

A wide variety of additives may be utilized. Preferably, however, the additive is selected based upon elemental testing and demonstrated performance in the areas of reduced friction, reduced heat generation, film forming capability, and chemical interaction with the gears and bearings. More preferably, the additive includes high concentrations of anti-wear (AW) and extreme-pressure (EP) compositions. Typically, phosphates are used as AW and EP additives. Specific additives may be selected according to their activation temperature and other characteristics. The additive also may preferably form, through a reaction of the nascent or oxidized moving component surface, a protective film on the surface thereof.

Alternatively, the additive need not necessarily be lubricious but only have desirable characteristics such as: an appropriate melting or vaporization temperature; high specific heat (heat capacity); and/or high latent heat of fusion or vaporization. During an oil-out condition, temperature control may be more important than lubrication, although both of these factors are important and somewhat interdependent. To achieve improved wetting (coverage) of the moving component surface and thereby increase moving component cooling, especially in the possible presence of residual lubricating oil, a non-polar liquid assists with miscibility of the lubricant. Alternatively, while being a polar liquid, water is also a candidate whose thermal properties meet the requirements and whose polarity can be modified by the addition of certain soaps or other substances that possess both polar and non-polar characteristics.

Although particular step sequences are shown, described, and claimed, it should be understood that steps may be performed in any order, separated or combined unless otherwise indicated and will still benefit from the present invention.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A lubrication system to lubricate moving components within a housing comprising:
   an additive stored under normal operational conditions; and
   a delivery system in communication with said additive for selective injection of said additive into the housing in response to an oil-out condition, wherein said delivery system includes a misting system.

2. The system as recited in claim 1, further comprising an oil reservoir for storage of a quantity of collected lubricating oil for selective release into the housing to lubricate the moving components in response to the oil-out condition wherein said delivery system selectively injects said additive into said quantity of collected lubricating oil prior to release of the collected lubricating oil into the housing.

3. The system as recited in claim 1, wherein said delivery system pressurizes said additive.

4. The system as recited in claim 1, wherein said delivery system selective releases said additive in response to a manual initiator.

5. The system as recited in claim 1, wherein said delivery system selectively releases said additive in response to a sensor system which identifies said oil-out condition.

6. A method to prolong operation of moving components within a housing during an oil-out condition comprising:
   storing an additive during normal operational conditions; and
   selectively injecting the additive into the housing in response to an oil-out condition.

7. A method as recited in claim 6, wherein said selectively injecting further comprises:

collecting a quantity of collected lubricating oil from a primary lubricating oil reservoir during a normal operational condition;

selectively communicating the quantity of collected lubrication oil into the housing in response to an oil-out condition; and selectively injecting the additive into the housing separate from the collected lubricating oil in response to the oil-out condition.

8. A method as recited in claim 6, wherein said selectively injecting further comprises:

collecting a quantity of collected lubricating oil from a primary lubricating oil reservoir during a normal operational condition;

selectively injecting the additive into the quantity of collected lubricating oil in response to an oil-out condition; and selectively communicating the quantity of collected lubricating oil injected with the additive into the housing.

9. A method as recited in claim 6, wherein said selectively injecting further comprises selective injection into a rotary-wing aircraft transmission gearbox housing.

\* \* \* \* \*